United States Patent
Maier et al.

(10) Patent No.: US 10,690,502 B2
(45) Date of Patent: Jun. 23, 2020

(54) CONCEPT FOR DRAWING UP A DIGITAL MAP OF A PARKING LOT

(71) Applicant: Robert Bosch GmbH, Stuttgart (DE)

(72) Inventors: Manuel Maier, Esslingen (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 93 days.

(21) Appl. No.: 15/574,615

(22) PCT Filed: Jun. 8, 2016

(86) PCT No.: PCT/EP2016/062930
§ 371 (c)(1),
(2) Date: Nov. 16, 2017

(87) PCT Pub. No.: WO2016/206970
PCT Pub. Date: Dec. 29, 2016

(65) Prior Publication Data
US 2018/0149483 A1    May 31, 2018

(30) Foreign Application Priority Data
Jun. 23, 2015   (DE) .......................... 10 2015 211 522

(51) Int. Cl.
*G01C 21/32*      (2006.01)
*G08G 1/01*       (2006.01)
(Continued)

(52) U.S. Cl.
CPC ............. *G01C 21/32* (2013.01); *B60W 40/06* (2013.01); *B60W 40/10* (2013.01);
(Continued)

(58) Field of Classification Search
CPC ...... G01C 21/32; H04L 67/12; G05D 1/0212; G05D 2201/0213; B60W 40/10;
(Continued)

(56) References Cited

U.S. PATENT DOCUMENTS

2002/0085095 A1* 7/2002 Janssen .................. G01C 15/00
                                                    348/148
2004/0267420 A1* 12/2004 Tanaka ................. B62D 15/027
                                                    701/36
(Continued)

FOREIGN PATENT DOCUMENTS

DE   102009017731 A1   11/2009
DE   102012216994 A1   3/2014
(Continued)

OTHER PUBLICATIONS

International Search Report dated Sep. 15, 2016, of the corresponding International Application PCT/EP20161062930 filed Jun. 8, 2016.

*Primary Examiner* — Yuen Wong
(74) *Attorney, Agent, or Firm* — Norton Rose Fulbright US LLP; Gerard Messina

(57) ABSTRACT

A method for operating a vehicle in order to draw up a digital map of a parking lot, the vehicle driving within the parking lot ascertaining data pertaining to its driving route within the parking lot and transmitting the ascertained data via a communications network to a map server, so that the map server is able to draw up a digital map of the parking lot on the basis of the data. A corresponding device is also described. A method for drawing up a digital map of a parking lot, a map server, and a computer program are also described.

24 Claims, 2 Drawing Sheets

(51) Int. Cl.
*B60W 40/10* (2012.01)
*B60W 40/06* (2012.01)
*G08G 1/015* (2006.01)
*G05D 1/02* (2020.01)
*H04L 29/08* (2006.01)
*G08G 1/04* (2006.01)

(52) U.S. Cl.
CPC ........... *G05D 1/0212* (2013.01); *G08G 1/015* (2013.01); *G08G 1/0112* (2013.01); *G08G 1/0129* (2013.01); *G08G 1/0141* (2013.01); *H04L 67/12* (2013.01); *G05D 2201/0213* (2013.01); *G08G 1/04* (2013.01)

(58) Field of Classification Search
CPC ..... B60W 40/06; G08G 1/015; G08G 1/0141; G08G 1/0129; G08G 1/0112; G08G 1/04
See application file for complete search history.

(56) References Cited

U.S. PATENT DOCUMENTS

| | | | |
|---|---|---|---|
| 2012/0101727 A1 | 4/2012 | Mays et al. | |
| 2013/0143536 A1 | 6/2013 | Ratti | |
| 2013/0211699 A1* | 8/2013 | Scharmann | G01C 21/32 |
| | | | 701/117 |
| 2014/0244125 A1 | 8/2014 | Dorum et al. | |
| 2014/0278096 A1 | 9/2014 | Davidson | |
| 2015/0371541 A1* | 12/2015 | Korman | G08G 1/147 |
| | | | 340/932.2 |
| 2017/0305467 A1* | 10/2017 | Nordbruch | B62D 15/0285 |

FOREIGN PATENT DOCUMENTS

| | | |
|---|---|---|
| DE | 102012222562 A1 | 6/2014 |
| EP | 2047213 A1 | 4/2009 |
| WO | 2008009965 A1 | 1/2008 |

\* cited by examiner

CONCEPT FOR DRAWING UP A DIGITAL MAP OF A PARKING LOT

FIELD

The present invention relates to a method and a device for operating a vehicle in order to be able to draw up a digital map of a parking lot. In addition, the present invention relates to a method for drawing up a digital map of a parking lot. Moreover, the present invention relates to a map server for drawing up a digital map of a parking lot, and it also relates to a computer program.

BACKGROUND INFORMATION

German Patent Application No. DE 10 2012 222 562 A1 describes a system for managed parking areas for transferring a vehicle from a starting position to a target position.

In fully automated (autonomous) so-called valet parking, a driver parks his vehicle at a drop-off location, e.g., in front of a parking structure, the vehicle then driving, on its own, from there to a parking position/parking bay and back again to the drop-off location.

German Patent Application No. DE 10 2012 216 994 A1 describes a method for procuring a parking space and a vacant-parking space assistance system.

To enable a vehicle to navigate within a parking lot and especially to enable a vehicle to drive autonomously inside a parking lot usually requires the availability of a digital map of the parking lot, based on which the vehicle is able to navigate.

SUMMARY

An object on which the present invention includes providing an efficient way to draw up a digital map of a parking lot.

This objective may be achieved in accordance with example embodiments of the present invention. Advantageous refinements of the present invention are described herein.

According to one aspect of the present invention, a method is provided for operating a vehicle in order to be able to draw up a digital map of a parking lot,
  wherein the vehicle driving within the parking lot ascertains data pertaining to its driving route within the parking lot; and
  the vehicle transmits the ascertained data via a communications network to a map server so that the map server is able to draw up a digital map of the parking lot on the basis of the data.

According to a further aspect, a device is provided for operating a vehicle so as to allow a digital map of a parking lot to be drawn up, the device including:
  a processor, which is designed to ascertain data pertaining to a driving route of the vehicle within the parking lot while the vehicle is driving within the parking lot; and
  a communications interface, which is designed to transmit the ascertained data via a communications network to a map server so that the map server is able to draw up a digital map of the parking lot on the basis of the data.

According to a still further aspect, a method for drawing up a digital map of a parking lot is provided,
  in which a map server receives data pertaining to a driving route of a vehicle within the parking lot via a communications network;

the map server draws up the digital map of the parking lot on the basis of the received data.

According to another aspect, a map server is provided for drawing up a digital map of a parking lot, the map server including:
  a communications interface, which is designed to receive data pertaining to a driving route of a vehicle within the parking lot via a communications network; and
  a processor, which is designed to draw up the digital map of the parking lot on the basis of the received data.

According to yet another aspect, a computer program is provided, which includes program code for carrying out the present method for operating a vehicle and/or for carrying out the present method for drawing up a digital map of a parking lot when the computer program is running on a computer.

According to one aspect, a vehicle is provided, which is designed or configured to carry out or implement the present method for operating a vehicle.

According to one aspect, a vehicle is provided, which includes the device for operating a vehicle.

The vehicle is a motor vehicle, for instance.

In other words, the present invention, in particular and among other things, encompasses the idea of a vehicle recording its driving route within the parking lot and sending or transmitting this information to the map server. In response, the map server draws up the digital map based on the data. The digital map of the parking lot is thus able to be drawn up in an efficient manner on the basis of the data ascertained by a vehicle during its travel within the parking lot. As a result, there is no need to carry out additional measurements of the parking lot, which also provides the technical advantage of allowing the digital map of the parking lot to be drawn up in an efficient manner.

A parking lot within the meaning of the present invention is used as a parking area for vehicles. The parking lot thus constitutes in particular a contiguous area that includes a plurality of parking spaces (in the case of a parking lot on private property) or parking slots (in the case of a parking space in a public area). Areas in which vehicles are to park are referred to as parking spaces, in particular.

According to one specific embodiment, the parking lot is developed as a parking building.

According to another specific embodiment, the parking lot is developed as a parking garage.

According to one specific embodiment, the communications network includes a WLAN network and/or a mobile radio telephony network.

In another specific embodiment, a communication via the communications network will be encoded or is encoded.

According to one specific embodiment, multiple vehicles are provided, each executing or implementing the present method for operating a vehicle on its own. Thus, a plurality of data sets of multiple vehicles that are driving within the parking lot are available for drawing up the digital map of the parking lot. Generally, the more information that is collected or recorded by the vehicles, the more precisely the digital map of the parking lot is able to be drawn up.

According to one specific embodiment, the device for operating a vehicle is developed or configured to execute or implement the method for operating a vehicle.

In another specific embodiment, the map server is designed or configured to execute or implement the present method for drawing up a digital map of a parking lot.

In another specific embodiment, it is provided that the vehicle ascertains odometer data that correspond to its traveled driving distance and that it transmits the ascertained odometer data in the form of data to the map server via the communications network.

This results in the specific technical advantage that the map server is able to draw up the digital map based on the traveled driving distance of the vehicle within the parking lot.

In another specific embodiment, the vehicle ascertains operating-dynamics data that correspond to its operating dynamics and transmits the ascertained operating-dynamics data in the form of data to the map server via the communications network.

This results in the particular technical advantage that the map server is able to draw up the digital map on the basis of the operating dynamics of the vehicle.

In another specific embodiment, the operating-dynamics data include at least one of the elements from the following group of operating-dynamics data: yaw rate data, steering angle data, transverse acceleration data, linear acceleration data and velocity data.

This provides the specific technical advantage that the digital map is able to be drawn up in an efficient manner.

According to another specific embodiment, the vehicle detects its environment with the aid of its environmental sensor system and ascertains environmental data that correspond to the detected environment; it then transmits the ascertained environmental data in the form of data to the map server via the communications network.

This results in the specific technical advantage that the map server is able to draw up the digital map of the parking lot on the basis of the ascertained environmental data.

According to a still further specific embodiment, it is provided that the vehicle transmits vehicle-specification data to the map server via the communications network, so that the map server is able to draw up the digital map based on the vehicle-specification data and in a manner that is specifically adapted to different vehicle types.

This results in the particular technical advantage that the map server is able to draw up the digital map based on the vehicle-specification data and in a manner that is specifically adapted to different vehicle types.

For example, vehicle-specification data include a wheelbase of the vehicle and/or possible steering angles, i.e., maximum steering angles, of the vehicle, for instance.

According to a still further specific embodiment, the vehicle checks an already produced digital map of the parking lot based on the ascertained data in order to detect potential errors in the already produced digital map, the vehicle reporting detected errors to the map server via the communications network.

This results in the particular technical advantage that potential errors in the digital map that was already produced are able to be detected in an efficient manner.

According to a still further specific embodiment, the processor is designed to ascertain odometer data that correspond to a traveled driving distance of the vehicle, and the communications interface is developed to transmit the ascertained odometer data in the form of data to the map server via the communications network.

In another specific embodiment, it is provided that the processor is developed to ascertain operating-dynamics data that correspond to operating dynamics of the vehicle, and the communications interface is designed to transmit the ascertained operating-dynamics data in the form of data to the map server via the communications network.

In a further specific embodiment, the processor is developed to ascertain environmental data that correspond to an environment of the vehicle that was detected with the aid of an environmental sensor system of the vehicle; the communications network is designed to transmit the ascertained environmental data in the form of data to the map server via the communications network.

In a further specific embodiment, the communications interface is developed to transmit vehicle-specification data to the map server via the communications network, so that the map server is able to draw up the digital map based on the vehicle-specification data and in a manner that is specifically adapted to different vehicle types.

In another specific embodiment, it is provided that the processor is developed to check an already existing digital map of the parking lot based on the ascertained data in order to detect possible errors in the already existing digital map; the communications interface is developed to report detected errors to the map server via the communications network.

According to another specific embodiment, the map server ascertains one or more driving route(s) for vehicles within the parking lot based on the received data, so that the drawn up map includes the ascertained driving route(s).

This results in the particular technical advantage that the drawn up digital map includes the ascertained driving route(s), so that vehicles to which this drawn-up digital map is made available are able to drive or navigate efficiently within the parking lot.

According to one specific embodiment, the processor is designed to ascertain one or multiple driving route(s) for vehicles within the parking lot on the basis of the received data, so that the drawn-up map includes the ascertained driving route(s).

Specific embodiments of the present method for operating a vehicle similarly result from corresponding specific embodiments of the device for operating a vehicle, and vice versa. In other words, technical functionalities for the method for operating a vehicle result from corresponding technical functionalities of the device for operating a vehicle, and vice versa.

This applies in a similar manner to the map server and to the method for drawing up a digital map of a parking lot. Here, too, technical functionalities of the map server result from corresponding technical functionalities of the method for drawing up a digital map of a parking lot, and vice versa.

Below, the present invention is explained in greater detail on the basis of preferred exemplary embodiments.

DETAILED DESCRIPTION OF EXAMPLE EMBODIMENTS

Figure 1:
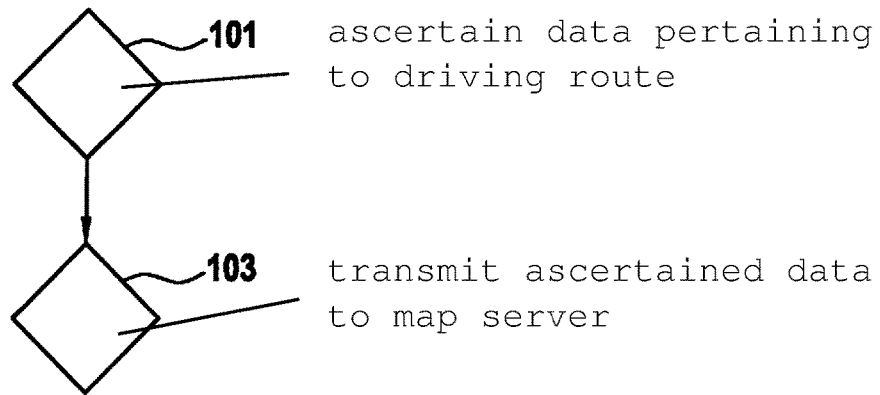
FIG. 1 shows a flow diagram of a method for operating a vehicle.

FIG. 1 shows a flow diagram of a method for operating a vehicle in order to be able to draw up a digital map of a parking lot.

According to a step 101, a vehicle that is driving within the parking lot ascertains data pertaining to its driving route within the parking lot. In particular, in a step 101 it may be provided that a plurality of vehicles traveling within the parking lot ascertains data regarding their respective driving routes within the parking lot.

In a step 103, it is provided that the ascertained data are transmitted from the vehicle to a map server via a communications network, so that the map server is able to draw up a digital map of the parking lot on the basis of the data. In one specific embodiment (not shown), it is provided that the map server draws up the digital map of the parking lot on the basis of the data.

In one specific embodiment, which is not shown, it is provided that in the case of multiple vehicles, the vehicles transmit their ascertained data via a communications network to the map server, so that the map server is able to draw up a digital map of the parking lot based on these data or, according to a further specific embodiment, the map server draws up a digital map of the parking lot.

Figure 2:
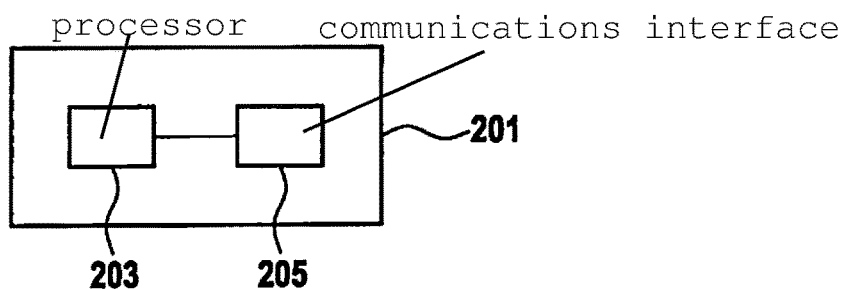
FIG. 2 shows a device for operating a vehicle.

FIG. 2 shows a device 201 for operating a vehicle in order to draw up a digital map of a parking lot.

Device 201 includes:
 a processor 203, which is developed to ascertain data pertaining to a driving route of the vehicle within the parking lot while the vehicle is driving within the parking lot; and
 a communications interface 205, which is designed to transmit the ascertained data via a communications network to a map server, so that the map server is able to draw up a digital map of the parking lot on the basis of the data.

Figure 3:
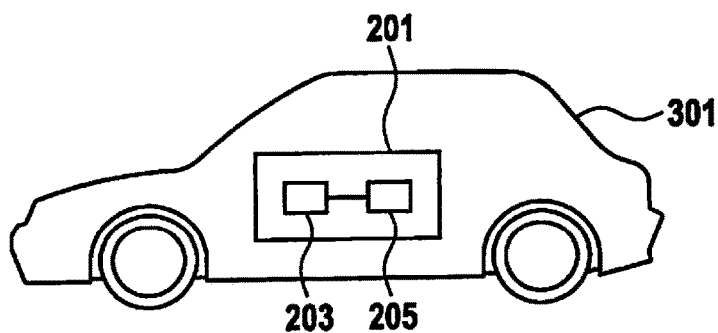
FIG. 3 shows a vehicle.

FIG. 3 shows a vehicle 301.

Vehicle 301 includes device 201 from FIG. 2.

For example, vehicle 301 is a motor vehicle, in particular a passenger car or a truck.

Figure 4:
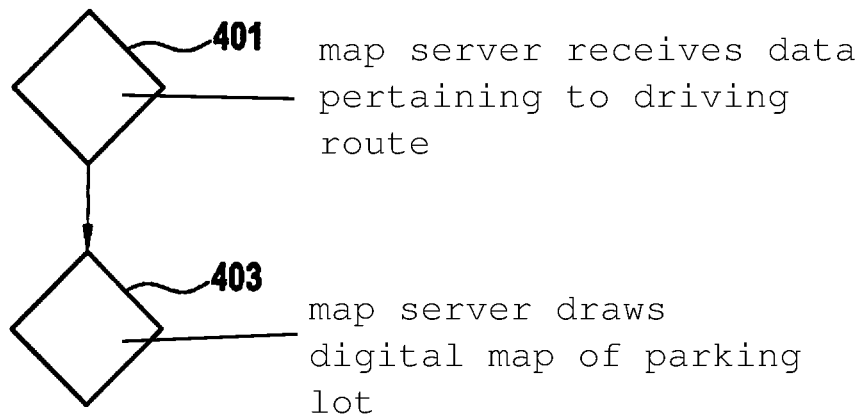
FIG. 4 shows a flow diagram of a method for drawing up a digital map of a parking lot.

FIG. 4 shows a flow diagram of a method for drawing up a digital map of a parking lot.

In a step 401, a map server receives data pertaining to a driving route of a vehicle within the parking lot via a communications network. In one specific embodiment, which is not shown, it may be provided that in step 401, the map server receives data pertaining to a respective driving route from a plurality of vehicles within the parking lot via a communications network.

According to a step 403 it is provided that the map server draws up the digital map of the parking lot on the basis of the received data. In one specific embodiment (not shown), it is provided that, in step 403, the map server draws up the digital map of the parking lot on the basis of the data from the plurality of vehicles received in each case.

Figure 5:
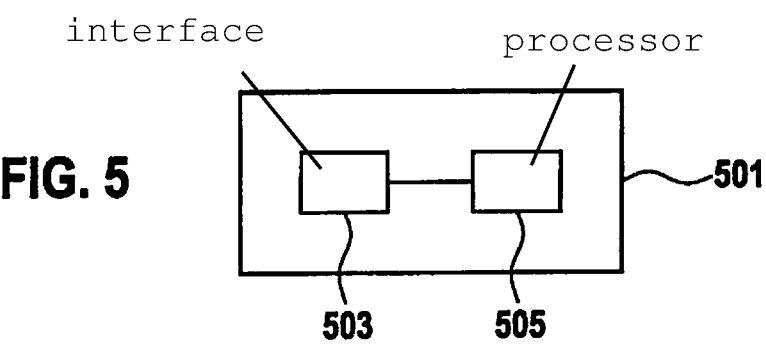
FIG. 5 shows a map server.

FIG. 5 shows a map server 501 for drawing up a digital map of a parking lot.

Map server 501 includes
 a communications interface 503, which is developed to receive data pertaining to a driving route of a vehicle within the parking lot via a communications network, and
 a processor 505, which is developed to draw up the digital map of the parking lot on the basis of the received data.

In particular and above all, the present invention thus encompasses the notion of vehicles recording their driving routes within parking lots and sending or transmitting this information to the map server. In other words, this information represents the data that are transmitted to the map server.

For example, the information includes information pertaining to a distance or driving route traveled (odometer data).

The information or data include, for example, operating-dynamics data (yaw rate data, steering angle data, transverse acceleration data, linear acceleration data, velocity data).

For instance, the information or data includes a distance between the vehicle and obstacles, and/or information about an environment of the vehicle (walls, entrance ramps, exit ramps). In other words, this information represents environmental data.

Using intelligent algorithms on the map server, possible driving routes for vehicles are able to be calculated on the basis of this information or data. For example, corner driving is able to be detected via steering angle data and/or yaw rates. Arrivals or departures of a vehicle within the parking lot are able to be detected via acceleration data from an acceleration sensor system, for example.

In another specific embodiment, vehicle-specification data (wheel base, possible steering angles) are also transmitted by the vehicles, so that the generated information (digital map) is able to be calculated or ascertained in a manner that is adapted to different vehicles.

According to one specific embodiment, date and/or time data are transmitted as well, meaning in particular that the transmitted data include a date stamp and/or a time stamp according to one specific embodiment.

According to one specific embodiment, it is provided that parking areas within the parking lot are identified or detected, so that the data transmitted to the map server include information about the detected parking areas. In an advantageous manner, the map server is therefore able to plot, include or integrate said information, i.e., the detected parking areas, in the digital map. This information is based on environmental data, in particular. In other words, environmental data are evaluated or analyzed in order to ascertain whether a parking area is located within the environment of the vehicle. The evaluation takes place directly in the vehicle, in particular. Preferably, the evaluation may also be carried out on the map server, either additionally or as an alternative.

According to one specific embodiment, it is provided that the vehicle(s) check(s) digital map data of an already produced digital map of the parking lot during another drive or during additional drives. According to one specific embodiment, the data may be odometer data and/or operating-dynamics data and/or environmental data. In particular, the data may be parking area data including the respective dimensions. In cases where the data no longer agree, the data are returned to the map server as faulty.

In one other specific embodiment, only the data are reported back and verified with the aid of the map server.

What is claimed is:
1. A method for a first vehicle, the method comprising:
 driving along a driving route within a parking lot, by the first vehicle; and
 the first vehicle transmitting data via a communications network to a map server;
 wherein:
  the data includes:
   (a) an identification of the driving route; and
   (b) a wheel base of the first vehicle and/or a capability of the first vehicle; and
  the map server to which the data is transmitted is configured to generate a digital map of the parking lot based on the identified driving route and based on the wheel base and/or capability of the data, wherein a second vehicle is enabled to drive within the parking lot based on the digital map.

2. The method as recited in claim 1, wherein the first vehicle ascertains odometer data that correspond to a traveled driving distance of the first vehicle in the driving along the driving route and transmits the ascertained odometer data to the map server via the communications network.

3. The method as recited in claim 1, wherein the first vehicle ascertains operating-dynamics data corresponding to operating dynamics of the first vehicle, and transmits the ascertained operating-dynamics data to the map server via the communications network.

4. The method as recited in claim 1, wherein the data further includes yaw rate data, and the map server is configured to generate the digital map further based on the yaw rate data.

5. The method as recited in claim 1, wherein the first vehicle detects an environment of the first vehicle using an environmental sensor system of the first vehicle, ascertains environmental data that correspond to the detected environment, and transmits the ascertained environmental data to the map server via the communications network.

6. The method as recited in claim 1, wherein the data includes the wheel base of the first vehicle, and the map server is configured to generate the digital map based on the wheel base of the first vehicle.

7. The method as recited in claim 1, wherein the first vehicle checks an already produced digital map of the parking lot to detect possible errors in the already produced digital map, the first vehicle reporting the detected possible errors to the map server via the communications network.

8. The method as recited in claim 1, wherein the data includes the capability of the first vehicle, and the map server is configured to generate the digital map based on the capability of the data.

9. The method as recited in claim 8, wherein the capability is indicated as an identification of a maximum steering angle that is implementable by the first vehicle.

10. The method as recited in claim 1, wherein the second vehicle is enabled for an automated drive of the second vehicle in the parking lot based on the generated digital map.

11. A device for a first vehicle, the device comprising:
a processor; and
a communications interface;
wherein:
the processor is configured to transmit data to a map server over a communications network via the communications interface;
the data includes:
(a) an identification of a driving route along which the first vehicle drives within a parking lot; and
(b) a wheel base of the first vehicle and/or a capability of the first vehicle; and
the map server to which the data is transmitted is configured to generate a digital map of the parking lot based on the identified driving route and based on the wheel base and/or capability of the data, wherein a second vehicle is enabled to drive within the parking lot based on the digital map.

12. The device as recited in claim 11, wherein the processor is designed to ascertain odometer data that correspond to a traveled driving distance of the first vehicle in the drive of the first vehicle along the driving route, the processor being designed to transmit the ascertained odometer data to the map server over the communications network via the communications interface.

13. The device as recited in claim 11, wherein the processor is designed to ascertain operating-dynamics data that correspond to operating dynamics of the first vehicle, and the processor is designed to transmit the ascertained operating-dynamics data to the map server over the communications network via the communications interface.

14. The device as recited in claim 11, wherein the processor is designed to ascertain environmental data that correspond to an environment of the first vehicle detected with the aid of an environmental sensor system of the first vehicle, and the processor is designed to transmit the ascertained environmental data to the map server over the communications network via the communications interface.

15. The device as recited in claim 11, wherein the processor is designed to check an already produced digital map of the parking lot to detect possible errors in the already produced digital map, and the processor is designed to report detected errors to the map server over the communications network via the communications interface.

16. A method comprising:
receiving, by a map server, via a communications network, and from a first vehicle, first data that includes an identification of a driving route along which the first vehicle drove within a parking lot and second data that includes characteristic data that identifies a characteristic of how the first vehicle is structured and/or a capability of the first vehicle;
generating, by the map server, a digital map of the parking lot based on the identified driving route and based on the identified characteristic and/or capability of the first vehicle; and
providing, by the map server, the digital map to a second vehicle, wherein the second vehicle is enabled to drive within the parking lot based on the digital map.

17. The method as recited in claim 16, wherein the characteristic data classifies the first vehicle as one of a plurality of vehicle classifications, and the generating of the digital map includes drawing up one of a plurality of versions of the digital map that corresponds to the one of the plurality of vehicle classifications into which the first vehicle has been classified.

18. The method as recited in claim 17, wherein the characteristic data includes an identification of a wheel base of the first vehicle.

19. The method as recited in claim 17, wherein the characteristic data identifies the capability of the first vehicle.

20. The method as recited in claim 19, wherein the capability is indicated as an identification of a maximum steering angle that is implementable by the first vehicle.

21. A map server comprising:
a processor; and
a communications interface;
wherein the processor is designed to:
receive, over a communications network, from a first vehicle, and via the communications interface, first data that includes an identification of a driving route along which a first vehicle drove within a parking lot and second data that includes characteristic data that identifies a characteristic of how the first vehicle is structured and/or a capability of the first vehicle;
generate a digital map of the parking lot based on the identified driving route and based on the identified characteristic and/or capability of the first vehicle; and
provide the digital map to a second vehicle, wherein the second vehicle is enabled to drive within the parking lot based on the digital map.

22. A vehicle comprising the device for the first vehicle of claim 11.

23. A non-transitory computer-readable storage medium on which is stored a computer program including program code, the computer program, when executed by a computer of a first vehicle, causing the computer to perform a method, the method comprising:
  controlling the first vehicle to:
    drive along a driving route within a parking lot; and
    transmit data via a communications network to a map server;
  wherein:
    the data includes:
      (a) an identification of the driving route; and
      (b) a wheel base of the first vehicle and/or a capability of the first vehicle; and
    the map server to which the data is transmitted is configured to generate a digital map of the parking lot based on the identified driving route and based on the wheel base and/or capability of the data, wherein a second vehicle is enabled to drive within the parking lot based on the digital map.

24. A non-transitory computer readable storage medium on which is stored a computer program including program code, the computer program, when executed by a map server, causing the map server to perform a method, the method comprising:
  receiving, via a communications network and from a first vehicle, first data that includes an identification of a driving route along which the first vehicle drove within a parking lot and second data that includes characteristic data that identifies a characteristic of how the first vehicle is structured and/or a capability of the first vehicle;
  generating a digital map of the parking lot based on the identified driving route and based on the identified characteristic and/or capability of the first vehicle; and
  providing, by the map server, the digital map to a second vehicle, wherein the second vehicle is enabled to drive within the parking lot based on the digital map.

* * * * *